(12) United States Patent
Maney

(10) Patent No.: US 8,719,155 B2
(45) Date of Patent: May 6, 2014

(54) VEHICLE RENTAL TRANSACTION SYSTEM AND METHOD

(75) Inventor: Charles Q. Maney, Dayton, OH (US)

(73) Assignee: NCR Corporation, Duluth, GA (US)

( * ) Notice: Subject to any disclaimer, the term of this patent is extended or adjusted under 35 U.S.C. 154(b) by 220 days.

(21) Appl. No.: 12/815,783

(22) Filed: Jun. 15, 2010

(65) Prior Publication Data

US 2011/0307375 A1 Dec. 15, 2011

(51) Int. Cl.
*G06Q 40/00* (2012.01)

(52) U.S. Cl.
USPC .......... 705/39; 705/307; 701/2; 701/49; 701/55; 701/410

(58) Field of Classification Search
USPC .............. 705/39, 307; 701/2, 49, 55, 410
See application file for complete search history.

(56) References Cited

U.S. PATENT DOCUMENTS

| | | | | |
|---|---|---|---|---|
| 6,584,403 | B2 * | 6/2003 | Bunn | 701/454 |
| 2007/0279241 | A1 * | 12/2007 | Jung et al. | 340/691.6 |
| 2009/0259349 | A1 * | 10/2009 | Golenski | 701/2 |
| 2010/0222939 | A1 * | 9/2010 | Namburu et al. | 701/2 |
| 2011/0187500 | A1 * | 8/2011 | Newman et al. | 340/5.83 |
| 2011/0313937 | A1 * | 12/2011 | Moore et al. | 705/307 |

OTHER PUBLICATIONS

Soon, C. D. (2009). Managing risk and uncertainty in transportation megaprojects. (Order No. 3367927, University of Hawai'i at Manoa). ProQuest Dissertations and Theses, , 409. Retrieved from http://search.proquest.com/docview/304894795?accountid=14756. (304894795).*

Vazquez Gomez, J. I. (2007). A reactive behavioural model for context-aware semantic devices. (Order No. 3308624, Universidad de Deusto (Spain)). ProQuest Dissertations and Theses, , 362. Retrieved from http://search.proquest.com/docview/304706958?accountid=14753. (304706958).*

* cited by examiner

*Primary Examiner* — Muriel Tinkler

(74) *Attorney, Agent, or Firm* — Paul W. Martin; Joseph P. Merhle

(57) ABSTRACT

A vehicle rental transaction system and method which provide a vehicle lot owner with a choice of options for vehicle security and customer convenience. The vehicle rental transaction system includes a computer for identifying a customer as part of a rental transaction involving a vehicle, and for sending a wireless message to the vehicle containing instructions for preparing the vehicle for the customer. Example instructions include, but are not limited to, unlocking doors and a trunk of the vehicle, adjusting power seats and power mirrors in accordance with customer preferences, adjusting climate control settings in accordance with the customer preferences, adjusting radio station settings in accordance with the customer preferences, and adjusting GPS settings in accordance with the customer preferences.

18 Claims, 4 Drawing Sheets

VEHICLE RENTAL TRANSACTION SYSTEM AND METHOD

BACKGROUND

Rental car lot owners frequently leave car keys in the car for customer and lot operator convenience. To mitigate theft, some rental car lots utilize secure entry and exit points to ensure cars are not improperly driven off the lot.

However such systems are not fool-proof as rogue individuals may still drive one or more open and accessible cars through obstacles associated with such secure entry and exit points. Further, some rental car lots or agencies maintain vehicles in the open in unsecure lots which results in a higher likelihood of theft where keys are left in unattended vehicles or the vehicles are left unlocked, and minimizes the ability to provide the customer or lot operator the convenience commensurate with leaving the keys in the car, including having the right key associated with the right car, and providing for unattended or self-service lot operation.

Rental car lot owners also fail to do much more to prepare vehicles for customers than cleaning the vehicles and ensuring they are full of fuel.

It would be desirable to provide a vehicle rental transaction system and method which provides a vehicle lot owner with a choice of options for vehicle security and customer convenience.

SUMMARY

A vehicle rental transaction system and method is provided.

The vehicle rental transaction system includes a computer for identifying a customer as part of a rental transaction involving a vehicle, and for sending a wireless message to the vehicle containing instructions for preparing the vehicle for the customer.

In one example embodiment, the computer is also for displaying screens and recording selections of the customer, for obtaining preferences of the customer, and for obtaining payment from the customer. The customer completes the transaction at the computer.

In another example embodiment, the computer is one of a plurality of computers used by the customer to complete the transaction. The computer completes the last part of the transaction, which may include obtaining preferences of the customer. Another computer completes a previous part of the transaction including displaying screens and recording selections of the customer and obtaining payment from the customer.

A vehicle rental transaction method includes identifying a customer as part of a rental transaction involving a vehicle by a computer, and sending a wireless message to the vehicle containing instructions for preparing the vehicle for the customer by the computer.

Example instructions include, but are not limited to, unlocking doors and a trunk of the vehicle, adjusting power seats and power mirrors in accordance with customer preferences, adjusting climate control settings in accordance with the customer preferences, adjusting radio station settings in accordance with the customer preferences, and adjusting GPS settings in accordance with the customer preferences.

The vehicle includes wireless communication circuitry for receiving messages addressed to the vehicle, and a vehicle control system for controlling vehicle components to meet the customer preferences.

DETAILED DESCRIPTION

Figure 1:
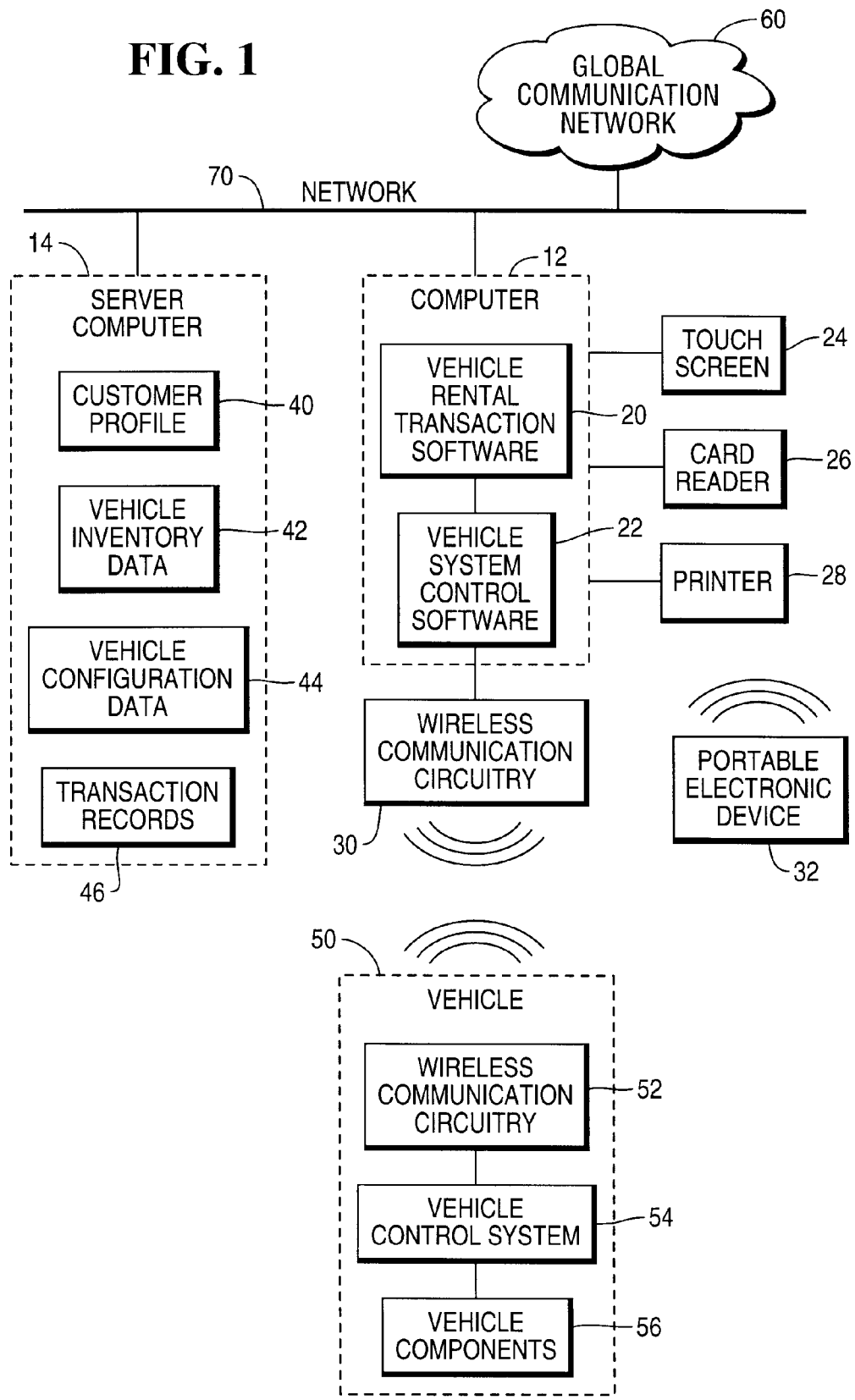
FIG. 1 is a block diagram of an example vehicle rental transaction system.

Referring now to FIG. 1, an example vehicle transaction system primarily includes computer 12.

Computer 12 includes a processor, memory, and program storage, and may execute an operating system such as a Microsoft operating system. Computer 12 may be located at a vehicle rental location. Computer 12 may be operated by an employee in an assisted mode, or by a customer in a self-service mode, or a combination of the two including, without limitation, being locally operated by a customer and locally or remotely operated as needed by an employee in an assist mode.

In an example assist mode, a computer operated by an employee or other representative of the vehicle lot owner is coupled to computer 12 via network 70 and/or global communications network 60. Computer 12 and the employee computer execute a sharing application to allow computer 12 to share screens and control with the employee computer when a customer operating computer 12 requires assistance with a vehicle rental transaction. Following a customer request initiated from computer 12 and received by the employee computer, the employee operates the employee computer to display current screens from computer 12 and make selections on behalf of the customer. If computer 12 and the employee computer are located within speaking distance, the customer and the employee may communicate directly. Otherwise, computer 12 and the employee computer may be equipped with microphones and speakers to facilitate voice communication between the customer and the employee over network 70 and/or global communication network 60.

Computer 12 executes vehicle rental transaction software 20, which completes a vehicle rental transaction under operator control. For example, vehicle rental transaction software 20 may record customer information entered by an operator, identify an available vehicle 50 from vehicle inventory data 42, process payment from the customer, and prepare vehicle 50 for the customer. Vehicle rental transaction software 20 stores the details of the transaction in transaction records 46.

Computer 12 may be coupled to peripherals for completing the vehicle rental transaction. For example, computer 12 may be coupled to a touch screen 24 and/or other suitable display and/or input device for displaying transaction screens of vehicle transaction software 20, for displaying instructions for completing the vehicle rental transaction from vehicle transaction software 20, and/or for recording customer identification information and other information entered by an operator. Further, computer 12 may be coupled to a card reader 26 for processing payment from the customer. Finally, computer 12 may be coupled to a printer 26 for printing a receipt and/or other documentation evidencing the vehicle rental transaction. Depending on the embodiment, an electronic receipt may be provided in lieu of or in addition to a physical (e.g., paper) receipt, which electronic receipt may be sent to a customer provided electronic mail address and/or cellular phone number via, for example, short message service (SMS), or other service.

In one example embodiment, computer 12 and its peripherals may be combined together to form a self-service kiosk. The self-service kiosk may be capable of sharing screens and control with an employee computer in an assist mode.

During the vehicle rental transaction, vehicle rental transaction software 20 may obtain and use customer information from customer profile 40. For example, customer profile 40 may contain driver's license information, credit card information, preferences for electronic receipts, preferences for messages and alerts to a customer communication device, including a communication device address, e.g., phone number, and/or customer preferences for vehicles 50, including vehicle features and settings.

Customers may register with a vehicle lot owner to store their information in customer profiles 40. For example, a customer may use computer 12 to create customer profile 40. Alternatively, the customer may use a home or other computer connected to server computer 14 via a global communication network 60, also known as the Internet. For this purpose, server computer 14 may be a web server computer.

Further, in some embodiments, information for a customer profile 40 may be obtained and populated from user selections associated with a current vehicle rental transaction, and/or associated with use of rental vehicle 50 wherein vehicle 50 may record and/or wirelessly communicate utilized vehicle settings, either during use of vehicle 50 and/or subsequent to the rental period (e.g., upon return of vehicle 50) to populate customer profile 40 for use in a subsequent vehicle rental transaction by the customer, as directed by the customer (e.g., in customer profile 40).

In lieu of entering identification information via touch screen 24, customers with customer profiles 40 may identify themselves during transactions by presenting a customer identification card, such as a customer loyalty or member card. Computer 12 may employ card reader 26 to read customer identification cards.

Alternately, customers may identify themselves by presenting a portable electronic device 32 having one or more wireless communication facilities which wirelessly communicate with computer 12 directly through wireless communication circuitry 30 or indirectly through global communication network 60 and network 70 to identify the customer. Such portable electronic devices 32 may include, without limitation, a personal digital assistant (PDA) and/or cellular telephone, which may wirelessly communicate with computer 12 via, without limitation, cellular (e.g., Global System for Mobile Communications (GSM) and/or Code division multiple access (CDMA)), 802.11x (e.g., wireless networking, including Wi-Fi standard and/or Bluetooth standard capable devices), and/or radio frequency identification (RFID).

Server computer 14 includes a processor, memory, and program storage, and may execute an operating system such as a Microsoft operating system. Server computer 14 may be located at the vehicle rental location or offsite. The functions of server 14 and computer 12 may be combined into a single computer.

Customer profile 40 and vehicle inventory data 42 may be stored by computer 12 or by server computer 14 accessible over network 70 and/or global communication network 60. Alternately, one or more portable electronic devices 32 presented by a customer to, and wirelessly communicating with, computer 12, may store customer profile 40 (including a portion thereof).

Computer 12 additionally executes vehicle system control software 22, which prepares vehicle 50 for the customer. Vehicle system control software 22 activates wireless communication circuitry 30 to communicate one or more control messages to vehicle 50. Vehicle system control software 22 may also receive messages from vehicle 50, including vehicle settings for populating customer profile 40.

Vehicle system control software 22 may determine information necessary for preparing vehicle 50 for the customer from vehicle configuration data 44, which may be stored by computer 12 or by server computer 14. Vehicle configuration data 44 may include detailed vehicle component information for each vehicle available for rent. For example, vehicle configuration data 44 may include information identifying whether vehicle 50 has power seats or manually adjustable seats.

Vehicle rental transaction software 20 may also access vehicle configuration data 44 to display features of vehicle 20. The customer may accept the choice of vehicle 50 or select a different vehicle 50 having features the customer wants.

In one example method of preparing vehicle 50, vehicle system control software 22 may unlock vehicle 50. Since vehicle 50 otherwise remains locked until the completion of a vehicle rental transaction, or shortly thereafter, the risk of theft is reduced.

Vehicle system control software 22 may perform one or more additional functions including but not limited to: start vehicle 50, adjust one or more seats of vehicle 50, adjust one or more mirrors of vehicle 50, turn on heating pads in seats, set climate control system of vehicle 50, configure one or more radio station presets of vehicle 50, turn on the radio of vehicle 50, open one or more windows of vehicle 50, unlatch the trunk, hatch, gate or equivalent of vehicle 50, enter destination information in a global positioning system (GPS) receiver of vehicle 50, flash the headlights and/or other lights of vehicle 50, and sound the horn of vehicle 50. The latter two functions serve to assist the customer in locating vehicle 50.

Vehicle system control software 22 may rely on information entered during the transaction to complete one or more of the functions above. For example, in order to adjust seats and mirrors, vehicle system control software 22 may obtain customer size information, such as height and weight, following entry during the transaction. As another example, vehicle system control software 22 may unlatch the trunk based upon an entry indicating that the customer has luggage. As yet another example, vehicle system control software 22 may enter destination information entered by a customer into the GPS receiver.

Vehicle system control software 22 may also rely on information in customer profile 40. For example, in order to adjust seats and mirrors, vehicle system control software 22 may obtain customer size information from a previously established customer profile 40.

Vehicle system control software 22 may also rely on other information, such as information obtained through global communication network 60. For example, in setting the climate control system, vehicle system control software 22 may obtain current temperature and humidity information for the area in which the vehicle lot is located.

Vehicle system control software 22 may further rely on a combination of sources of information. For example, in setting climate control system, vehicle system control software 22 may rely on both current temperature and humidity information obtained from global communications network 60, but also customer criteria entered during the transaction or obtained from customer profile 40, such as vehicle inside temperature preferences.

Vehicle system control software 22 may prepare vehicle 50 following printing of a receipt, after a predetermined delay approximating the time necessary for the customer to walk to vehicle 50, or in stages. For example, vehicle system control software 22 may configure seats, mirrors, and radio stations following printing of the receipt, wait a first predetermined delay to activate vehicle lights to assist the customer in locating vehicle 50, and wait a second predetermined delay to unlock vehicle 50 and unlatch the trunk. Each of the delay periods may be standard delay periods for all vehicles, and/or be approximated based upon vehicle location information in vehicle inventory data 42, and/or be based upon customer preference (e.g., from customer profile 40).

Vehicle 50 includes wireless communication circuitry 52, which communicates with wireless communication circuitry 30 to receive commands from vehicle system control software 22. Wireless communication circuitry 52 may also send acknowledgment messages, vehicle status messages, or other types of messages (including vehicle usage and/or current setting information) to vehicle system control software 22.

Vehicle 50 further includes vehicle control system 54 for controlling vehicle components 56. Vehicle components 56 may include any vehicle component or any associated control circuitry that a vehicle lot owner wishes to control for the benefit of customers. For example, vehicle components 56 may include but not be limited to the vehicle engine control module, power seat actuators, power window actuators, power mirror actuators, heating pads, climate control system, entertainment system, trunk latch, lights, horn, and GPS receiver.

Vehicle control system 54 receives the commands from vehicle system control software 22 through wireless communication circuitry 52 and activates vehicle components 56 identified in the commands. For example, if the commands include an unlock command, vehicle control system 54 activates electric door locks to an unlock position.

Vehicle control system 54 may include one or more add-in modules that couple to vehicle components 56. Each vehicle control system 54 has a unique communication address, which is stored in vehicle inventory data 44.

Figure 2:
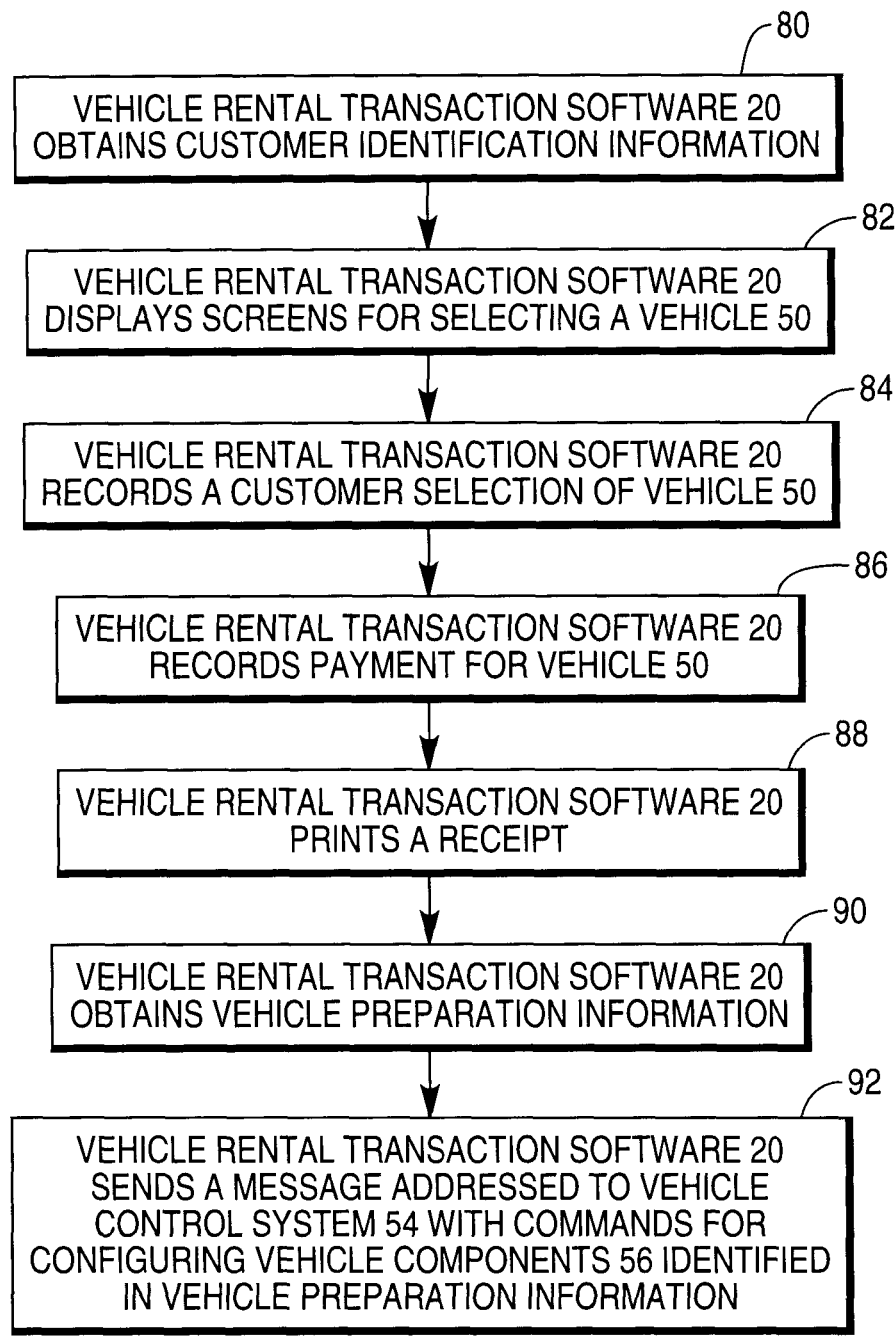
FIG. 2 is a flow diagram illustrating an example vehicle rental transaction method.

With reference to FIG. 2, an example vehicle rental transaction method is illustrated.

In step 80, vehicle rental transaction software 20 displays screens directing the customer to provide customer identification information and obtains the customer identification information. Vehicle rental transaction software 20 may record the customer identification information as it is being entered by a customer using touch screen 24. Alternatively, vehicle rental transaction software 20 may record the customer identification information from a customer card using card reader 26.

Vehicle rental transaction software 20 may additionally determine whether the customer has created a customer profile 40. If so, vehicle rental transaction software 20 may obtain information from customer profile 40 to use during the transaction. If not, vehicle rental transaction software 20 may display a screen that gives the customer an opportunity to create a customer profile 40.

In step 82, vehicle rental transaction software 20 displays screens for selecting a vehicle 50 using touch screen 24. Vehicle rental transaction software 20 may display vehicle preference information from customer profile 40, if one exists. Vehicle rental transaction software 20 may also allow a customer to enter preferences using touch screen 24. Vehicle rental transaction software 20 attempts to display choices from vehicle inventory data 44 that meet customer preferences and notes exceptions when they exist.

In step 84, vehicle rental transaction software 20 records a customer selection of vehicle 50.

In step 86, vehicle rental transaction software 20 records payment for the selected vehicle 50 using card reader 26. Vehicle rental transaction software 20 may additionally check to ensure the customer's payment card is valid.

In step 88, vehicle rental transaction software 20 prints a receipt using printer 28.

In step 90, vehicle rental transaction software 20 obtains vehicle preparation information. Vehicle preparation information may include a command to unlock vehicle doors.

Vehicle rental transaction software 20 may obtain the preparation information as it is being entered by a customer using touch screen 24. For example, the customer may enter a preference for power seats and that the power seats be adjusted based upon entered height and/or weight.

Alternatively, vehicle rental transaction software 20 may obtain the preparation information from customer profile 40.

In step 92, vehicle rental transaction software 20 instructs vehicle system control software 22 to send a message addressed to vehicle control system 54 with commands for configuring vehicle components 56 identified in the vehicle preparation information.

Vehicle control system 54 receives the message through wireless communication circuitry 52, determines that the message is addressed to vehicle 50, and implements the commands in the message to configure vehicle 50.

Figure 3:
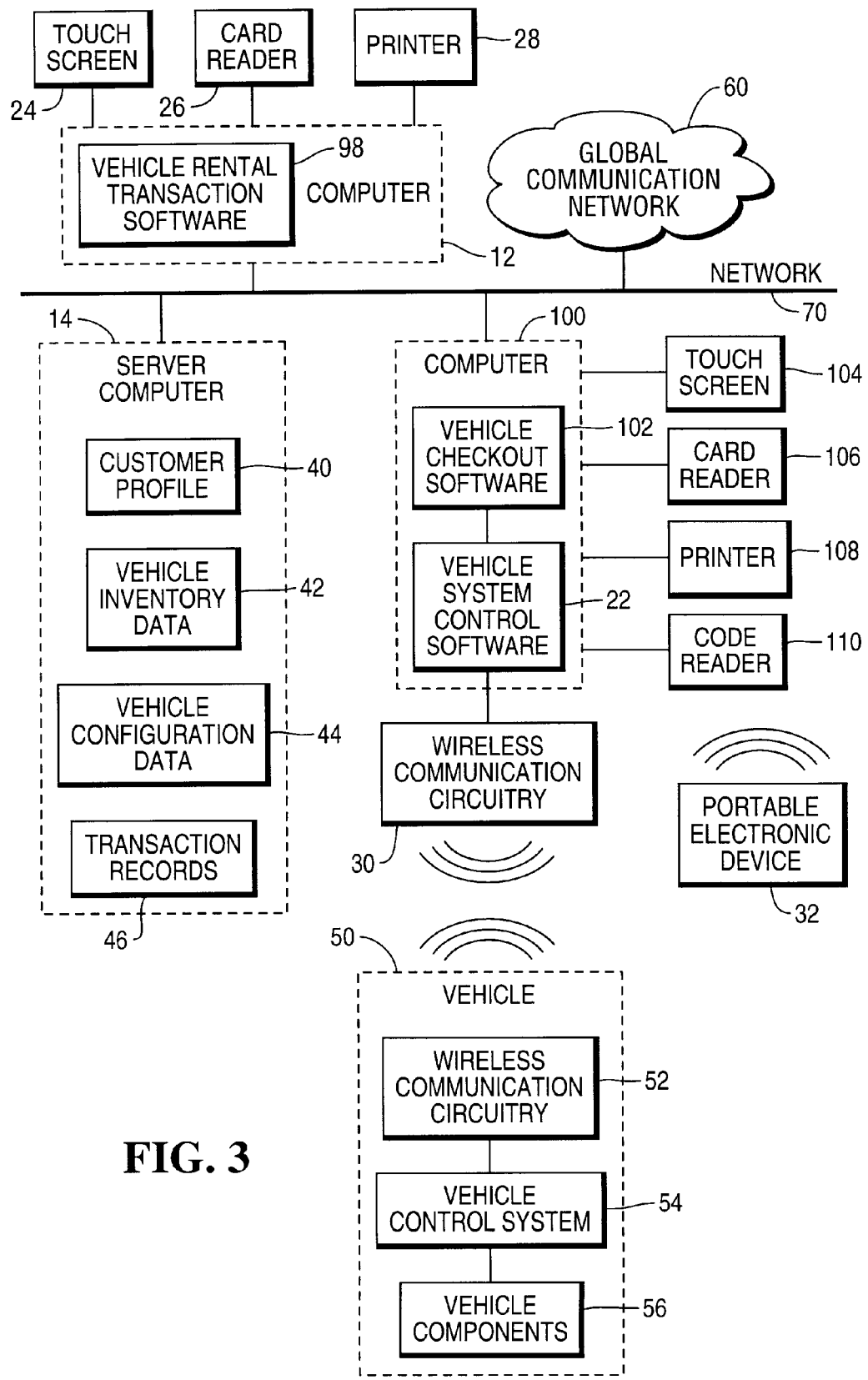
FIG. 3 is a block diagram of another example vehicle rental transaction system.

Referring now to FIG. 3, another example vehicle rental transaction system uses computer 100 in addition to computer 12.

Computer 100 includes a processor, memory, and program storage, and may execute an operating system such as a Microsoft operating system. Computer 100 may be located closer to vehicles at a vehicle rental location than computer 12. Computer 100 may be operated by an employee in an assisted mode, or by a customer in a self-service mode.

Computer 12 executes vehicle rental transaction software 98 to complete a portion of a vehicle rental transaction up to vehicle preparation. During this portion of the transaction, vehicle rental transaction software 98 may provide the customer with any suitable form of identification information in order to complete vehicle checkout. For example, the identification information may include a personal identification number (PIN). As another example, the information may include a code, such as a barcode printed on a receipt. Vehicle rental transaction software 98 stores the details of the transaction so far, including issued identification information, in transaction records 46.

As yet another example, the information may be contained within a radio frequency identification (RFID) tag or other wireless card issued to the customer by the vehicle lot owner.

Alternatively, the customer may use an identification card, such as a customer loyalty or member card previously issued to the customer by the vehicle lot owner.

As yet another example, the information may be sent to portable electronic device 32 of the customer.

Computer 12 may be coupled to additional peripherals to deliver and program implemented forms of identification. For example, computer 12 may include an RFID tag reader/writer for programming an RFID tag. As another example, computer 12 may be coupled to wireless card reader/writer for programming a wireless card. Computer 12 may additionally be coupled to a dispenser for dispensing one of these forms of identification.

Following payment and, as required or desired, printing of a receipt and/or generation of an electronic receipt, the customer proceeds to computer 100 to complete the transaction.

Computer 100 executes vehicle checkout software 102, which displays screens for completing the remainder of the vehicle rental transaction, including identifying any of the customer, vehicle 50, or transaction, or combination thereof.

Vehicle checkout software 102 requires some form of identification before releasing vehicle 50. Vehicle checkout software 102 may accept or require one or more forms of identification information. For example, vehicle checkout software 102 may accept PIN entry via touch screen 106. As another example, vehicle checkout software 102 may accept information from a customer card via card reader 108, such as a loyalty or member card, or other card issued by the vehicle lot owner. As yet another example, vehicle checkout software 102 may accept information stored within a barcode printed on a receipt or an RFID tag delivered to the customer by computer 12 via code reader 110. Code reader 110 may be either or a combination of a barcode reader and an RFID tag reader. As yet another example, vehicle checkout software 102 may accept information from portable electronic device 32.

Vehicle checkout software 102 compares identification information presented by a person to records 46 of transactions at computer 12. If vehicle checkout software 102 finds the person in the transaction records 46 and determines that the person has presented sufficient identification information, vehicle checkout software 102 initiates preparation of the vehicle 50 identified in the customer's transaction record 46. Otherwise, vehicle checkout software 102 directs the customer to a manager.

Computer 100 further executes vehicle system control software 22 and is equipped with wireless communication circuitry 30. Following identification, vehicle system control software 22 receives an instruction to proceed with vehicle preparation from vehicle checkout software 102.

In one example embodiment, computer 100 and its peripherals may be combined together to form a self-service kiosk. The self-service kiosk may be capable of sharing screens and control with an employee computer in an assist mode.

Figure 4A:
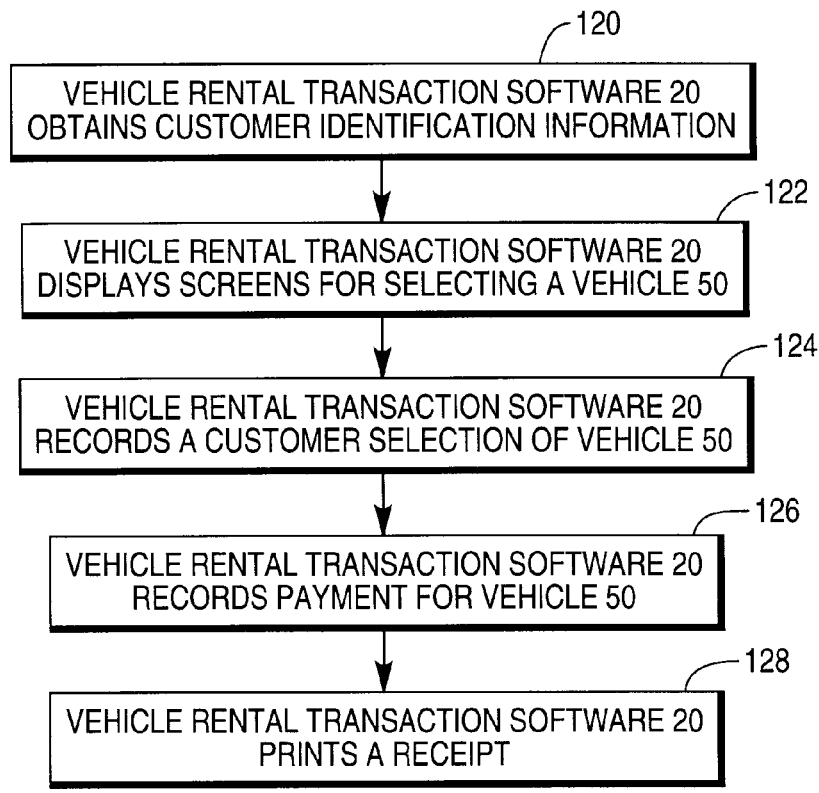
FIGS. 4a and 4b form a flow diagram illustrating another example vehicle rental transaction method.

With reference to FIG. 4a, a first portion of another example vehicle rental transaction method is illustrated. The first portion is completed at computer 12.

In step 120, vehicle rental transaction software 102 obtains customer identification information. Vehicle rental transaction software 102 may record the customer identification information as it is being entered by a customer using touch screen 24. Alternatively, vehicle rental transaction software 20 may record the customer identification information from a customer card using card reader 26.

Vehicle rental transaction software 102 may additionally determine whether the customer has created a customer profile 40. If so, vehicle rental transaction software 102 may obtain information from customer profile 40 to use during the transaction. If not, vehicle rental transaction software 102 may display a screen that gives the customer an opportunity to create a customer profile 40.

In step 122, vehicle rental transaction software 102 displays screens for selecting a vehicle 50 using touch screen 24. Vehicle rental transaction software 102 may display vehicle preference information from customer profile 40, if one exists. Vehicle rental transaction software 102 may also allow a customer to enter preferences using touch screen 24. Vehicle rental transaction software 102 attempts to display choices from vehicle inventory data 44 that meet customer preferences and notes exceptions when they exist.

In step 124, vehicle rental transaction software 102 records a customer selection of vehicle 50.

In step 126, vehicle rental transaction software 102 records payment for the selected vehicle 50 using card reader 26. Vehicle rental transaction software 102 may additionally check to ensure the customer's payment card is valid.

In step 128, vehicle rental transaction software 102 prints and/or otherwise provides a receipt (e.g., using printer 28, and/or via electronic mail and/or SMS). In one example embodiment, the receipt may contain a barcode for identifying any of the customer (including preferences), vehicle 50, or the transaction, or any combination thereof.

Figure 4B:
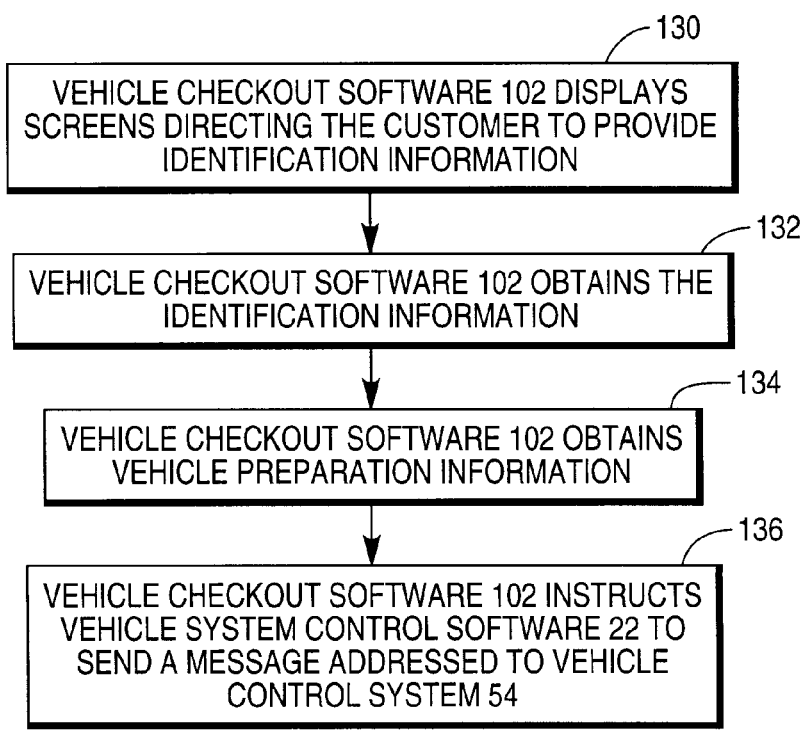

The customer proceeds to computer 100, which may be located in close proximity to vehicles 50. With reference to FIG. 4b, the customer completes the second portion of the other example vehicle transaction method at computer 100.

In step 130, vehicle checkout software 102 displays screens directing the customer to provide identification information.

In step 132, vehicle checkout software 102 obtains the identification information. For example, vehicle checkout software 102 may obtain the identification information from the receipt containing the barcode via code reader 110.

As another example, vehicle checkout software 102 may obtain a customer entered PIN entry via touch screen 106. As another example, vehicle checkout software 102 may obtain information from a customer card via card reader 108. As yet another example, vehicle checkout software 102 may accept information stored within an RFID tag via code reader 110. As described hereinabove, such receipt may be physical (e.g., paper) and/or electronic (e.g., presented via a display screen of a PDA or cellular phone).

Vehicle checkout software 102 initiates vehicle preparation after vehicle checkout software 102 determines that the person trying to obtain vehicle 50 has presented sufficient identification information.

In step 134, vehicle checkout software 102 obtains vehicle preparation information. Vehicle preparation information may include a command to unlock vehicle doors.

Vehicle checkout software 102 may obtain the preparation information as it is being entered by a customer using touch screen 106. For example, the customer may enter a preference for power seats and that the power seats be adjusted based upon entered height and/or weight.

Alternatively, vehicle checkout software 102 may obtain the preparation information from customer profile 40.

In step 136, vehicle checkout software 102 instructs vehicle system control software 22 to send a message addressed to vehicle control system 54 with commands for configuring vehicle components 56 identified in the vehicle preparation information.

Vehicle control system 54 receives the message through wireless communication circuitry 52, determines that the message is addressed to vehicle 50, and implements the commands in the message to configure vehicle 50.

Although particular reference has been made to certain embodiments, variations and modifications are also envisioned within the spirit and scope of the following claims.

What is claimed is:

1. A vehicle rental transaction system comprising:
   a computer having memory and one or more processors; and
   vehicle rental transaction software residing as instructions in the memory and executing on the one or more processors and configured for identifying a customer as part of a rental transaction involving a vehicle, and for sending a wireless message to the vehicle including instructions for preparing the vehicle for the customer, the vehicle rental transaction software also configured to send customer preferences of the customer directly to the vehicle to prepare the vehicle for the customer based on the customer preferences, and the profile includes instructions for vehicle settings that include: adjusting power seats and power mirrors in accordance with customer preferences in the profile, adjusting climate control settings in accordance with the profile, adjusting GPS settings in accordance with the profile, adjusting radio station settings in accordance with the profile, the vehicle settings activated in stages based at least in part on the customer preferences and a location for the vehicle.

2. The system of claim 1, wherein the instructions comprise an unlock instruction for unlocking doors of the vehicle.

3. The system of claim 1, wherein the computer is also for obtaining the customer preferences, and wherein the instructions are tailored to satisfying the customer preferences.

4. The system of claim 3, wherein the computer obtains the customer preferences from the customer profile previously completed by the customer.

5. The system of claim 3, wherein the computer obtains the customer preferences during the rental transaction.

6. The system of claim 3, wherein the computer obtains the customer preferences from a portable electronic device provided by the customer.

7. The system of claim 1, wherein the computer is also for sending an additional wireless message to the vehicle containing additional instructions for preparing the vehicle for the customer after a predetermined time period following the one wireless message.

8. The system of claim 1, wherein the computer is also for obtaining payment from the customer, and wherein the computer sends the message following receipt of the payment from the customer.

9. The system of claim 1, wherein the computer is a self-service kiosk.

10. A vehicle rental transaction system comprising:
a computer for displaying screens and recording selections of a customer during a rental transaction involving a vehicle, for obtaining preferences of the customer as a customer profile for using the vehicle, for obtaining payment from the customer, and for sending a wireless message to the vehicle containing instructions to unlock the vehicle and to prepare the vehicle for the customer based upon the customer profile, the instructions include vehicle settings for: adjusting climate controls, adjusting GPS settings, and adjusting a radio station, the vehicle settings activated in stages based at least in part on the customer profile and a location for the vehicle, and the customer profile updated for the customer based on other settings used in the vehicle by the customer during a rental of the vehicle, the other settings sent from a vehicle control system back to the computer.

11. A vehicle rental transaction system comprising:
a first computer having memory and one or more processors configured with executable instructions within the memory that execute on the one or more processors for displaying screens and recording selections of a customer during a rental transaction involving a vehicle, and for obtaining payment from the customer;
a second computer having memory and one or more processors configured with executable instructions within the memory that execute on the one or more processors for identifying the customer, for obtaining preferences of the customer, and for sending a wireless message to the vehicle containing instructions for vehicle settings: to adjust seats and mirrors in the vehicle and to prepare the vehicle for the customer based upon preferences defined in a profile for the customer, and the seats and mirrors are adjusted based on a weight and height defined for the customer in the profile, and the vehicle settings also directing the vehicle to adjust climate control settings, to adjust GPS settings, and to adjust a station, the vehicle settings sent directly to the vehicle to prepare the vehicle for the customer based on the preferences, the vehicle settings activated in stages based at least in part on the customer preferences and a location for the vehicle.

12. A vehicle rental transaction method comprising:
identifying, at a processor, a customer as part of a rental transaction involving a vehicle; and
sending, from the processor, a wireless message to the vehicle containing instructions for preparing the vehicle for the customer via a second processor in the vehicle, the instructions for vehicle settings that direct the second processor to prepare the vehicle by adjusting climate controls within the vehicle based on the second processor communicating with a global communications network to obtain a current temperature and humidity reading for a location of the vehicle, the vehicle settings also directing the second processor for performing the following actions: adjusting power seats and power mirrors in accordance with customer preferences in the profile, adjusting GPS settings in accordance with the profile, adjusting radio station settings in accordance with the profile, and honking a horn or flashing lights of the vehicle so that the customer can locate the vehicle profile, the vehicle settings activated in stages based at least in part on the customer preferences and a location for the vehicle.

13. The method of claim 12, further comprising:
obtaining preferences of the customer to be used to prepare the vehicle by the computer.

14. The method of claim 13, further comprising:
displaying screens and recording selections of a customer during the rental transaction by the computer; and
obtaining payment from the customer by the computer.

15. The method of claim 12, wherein the identifying step comprises:
comparing identification information presented by the customer to records of transactions initiated at another computer to determine whether to release the vehicle to the customer.

16. The method of claim 12, further comprising:
sending an additional wireless message to the vehicle containing additional instructions for preparing the vehicle for the customer after a predetermined time period following the one wireless message.

17. The method of claim 12, wherein the instructions comprise an unlock instruction for unlocking doors and a trunk of the vehicle.

18. The method of claim 13, wherein the instructions comprise adjusting power seats and power mirrors in accordance with the preferences.

* * * * *